US011138124B2

(12) United States Patent
Tomic et al.

(10) Patent No.: US 11,138,124 B2
(45) Date of Patent: Oct. 5, 2021

(54) MIGRATING DATA BETWEEN BLOCK POOLS IN A STORAGE SYSTEM

(71) Applicant: International Business Machines Corporation, Armonk, NY (US)

(72) Inventors: Sasa Tomic, Kilchberg (CH); Radu Ioan Stoica, Zurich (CH); Nikolaos Papandreou, Thalwil (CH); Nikolas Ioannou, Zurich (CH); Roman Alexander Pletka, Uster (CH); Aaron Daniel Fry, Richmond, TX (US); Timothy Fisher, Cypress, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/669,287

(22) Filed: Oct. 30, 2019

(65) Prior Publication Data

US 2021/0133110 A1    May 6, 2021

(51) Int. Cl.
| | |
|---|---|
| *G06F 12/0882* | (2016.01) |
| *G06F 12/02* | (2006.01) |
| *G06F 3/06* | (2006.01) |
| *G06F 9/50* | (2006.01) |

(52) U.S. Cl.
CPC .......... *G06F 12/0882* (2013.01); *G06F 3/061* (2013.01); *G06F 3/064* (2013.01); *G06F 3/0647* (2013.01); *G06F 3/0659* (2013.01); *G06F 3/0679* (2013.01); *G06F 9/505* (2013.01); *G06F 12/0246* (2013.01)

(58) Field of Classification Search
CPC ...... G06F 12/0882; G06F 3/061; G06F 3/064; G06F 3/0647; G06F 3/0659; G06F 3/0679; G06F 9/505; G06F 12/0246
USPC ........................................................ 711/103
See application file for complete search history.

(56) References Cited

U.S. PATENT DOCUMENTS

| | | | |
|---|---|---|---|
| 9,678,874 B2 | 6/2017 | Nellans et al. | |
| 9,727,454 B2 | 8/2017 | Kuzmin et al. | |
| 10,101,942 B1 | 10/2018 | Parker et al. | |
| 2017/0180478 A1* | 6/2017 | Hashimoto | ......... G06F 12/0246 |

(Continued)

OTHER PUBLICATIONS

Anonymous, "Method of Error Correction in MBC Flash Memory," IP.com Prior Art Database, Technical Disclosure No. IPCOM000141832D, Oct. 16, 2006, 28 pages.

(Continued)

*Primary Examiner* — Gautam Sain
(74) *Attorney, Agent, or Firm* — Zilka-Kotab, P.C.

(57) ABSTRACT

A computer-implemented method, according to one embodiment, includes: determining whether a number of blocks included in a RTU queue associated with a first block pool is in a first predetermined range. In response to determining that the number of blocks included in the RTU queue is not in the first predetermined range, a determination is made as to whether a current I/O workload is in a second predetermined range. In response to determining that the current I/O workload is in the second predetermined range, for each block in the first block pool having a desired amount of metadata associated with the pages in the given block: a subset of pages in the given block are selected and data is relocated therefrom to a block in the second block pool.

18 Claims, 13 Drawing Sheets

(56) References Cited

U.S. PATENT DOCUMENTS

2018/0267720 A1* 9/2018 Goldberg .............. G06F 3/0619
2019/0369899 A1* 12/2019 Tanpairoj ............ G06F 12/0253

OTHER PUBLICATIONS

Anonymous, "Method for better performance by smart garbage collector invocation on SSD in high reliability environment," IP.com Prior Art Database, Technical Disclosure No. IPCOM000223784D, Nov. 29, 2012, pp. 1-5.

Anonymous, "Passing information from Host to a Flash System to help improve performance and decrease write amplification," IP.com Prior Art Database, Technical Disclosure No. IPCOM000236795D, May 16, 2014, pp. 1-2.

Anonymous, "Method and System for Reducing Performance Impact of Solid-state Drive Garbage Collection in a Mirrored Environment Using Internal Stats," IP.com Prior Art Database, Technical Disclosure No. IPCOM000245733D, Apr. 4, 2016, pp. 1-3.

Komsul, M., "Real Time and Performance Management Techniques in SSD Storage Systems," Thesis, University of Leicester, Jul. 2016, pp. 1-170.

Micron, "Garbage Collection in Single-Level Cell NAND Flash Memory," Technical Note, Micron Technology Inc., 2011, pp. 1-4.

Webster, S., "Intel SSD 660p 1TB Review: QLC Goes Mainstream," Tom's Hardware, Aug. 7, 2018, 20 pages, retrieved from https://www.tomshardware.com/reviews/intel-ssd-660p-qlc-nvme,5719.html.

Pletka et al., U.S. Appl. No. 16/459,393, filed Jul. 1, 2019.
Pletka et al., U.S. Appl. No. 16/508,140, filed Jul. 10, 2019.

* cited by examiner

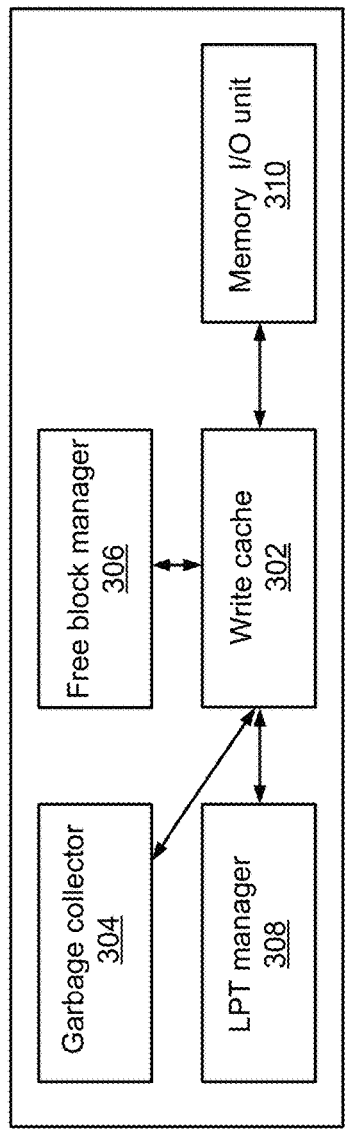
FIG. 3
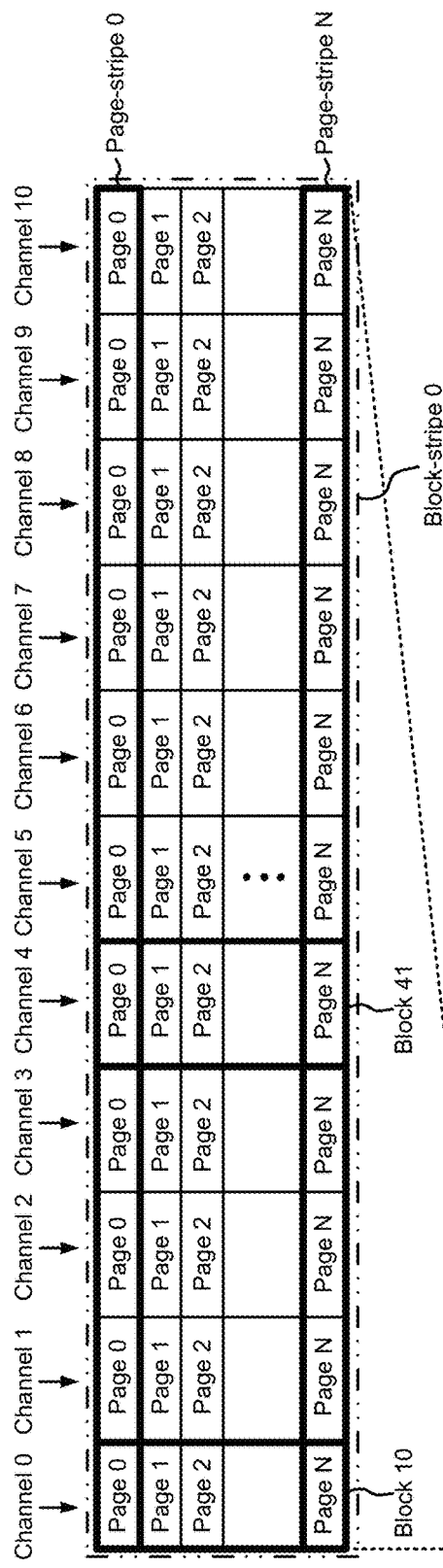
FIG. 4
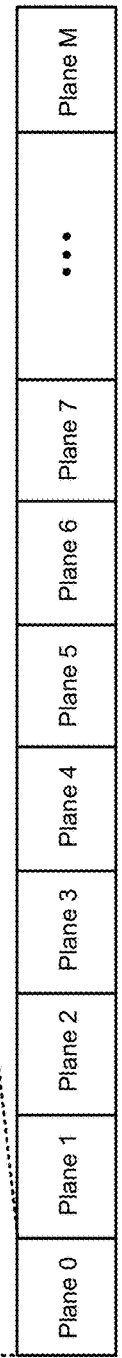

MIGRATING DATA BETWEEN BLOCK POOLS IN A STORAGE SYSTEM

BACKGROUND

The present invention relates to data storage systems, and more particularly, this invention relates to migrating data between at least two different block pools in a storage system.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is anywhere from 256, to 512, or even several thousands of pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH, LDPC, or other codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The physical configurations of memory blocks in non-volatile memory have also changed over time. For instance, in the past Flash blocks had a single-bit-per-cell configuration, but improvements in data storage have introduced Flash blocks that implement multi-bit-per-cell configurations. Some Flash blocks also support more than one different physical configuration, e.g., based on their given mode. Moreover, hybrid controllers are capable of managing and/or adapting these blocks which are configured in single-bit-per-cell mode as well as multi-bit-per-cell mode.

SUMMARY

A computer-implemented method, according to one embodiment, is for migrating data between block pools in a storage system. In some approaches the computer-implemented method includes: determining whether a number of blocks included in a ready-to-use (RTU) queue associated with a first block pool is in a first predetermined range. The blocks in the first block pool are configured in single-level cell (SLC) mode, while blocks in a second block pool are configured in multi-bit-per-cell mode. In response to determining that the number of blocks included in the RTU queue is not in the first predetermined range, a determination is made as to whether a current input/output (I/O) workload experienced by the storage system is in a second predetermined range. In response to determining that the current I/O workload is in the second predetermined range, for each block in the first block pool: a determination is made as to whether an amount of metadata associated with the pages in the given block is greater than a predetermined threshold. In response to determining that the amount of metadata associated with the pages in the given block is greater than the predetermined threshold, a subset of pages in the given block are selected. Moreover, data is relocated from the selected subset of pages in the given block to a block in the second block pool.

A computer program product, according to another embodiment, is for migrating data between block pools in a storage system. The computer program product includes a computer readable storage medium having program instructions embodied therewith. Moreover, the program instructions are readable and/or executable by a processor to cause the processor to: perform the foregoing method.

A system, according to yet another embodiment, includes: a plurality of non-volatile random access memory (NVRAM) blocks configured to store data, a processor, and logic integrated with and/or executable by the processor for migrating data between block pools in a storage system. Moreover, the logic is configured to: perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a system diagram, in accordance with one embodiment.

FIG. 4 is a conceptual diagram which includes a block-stripe and page-stripe, in accordance with one embodiment.

DETAILED DESCRIPTION

Figure 1:
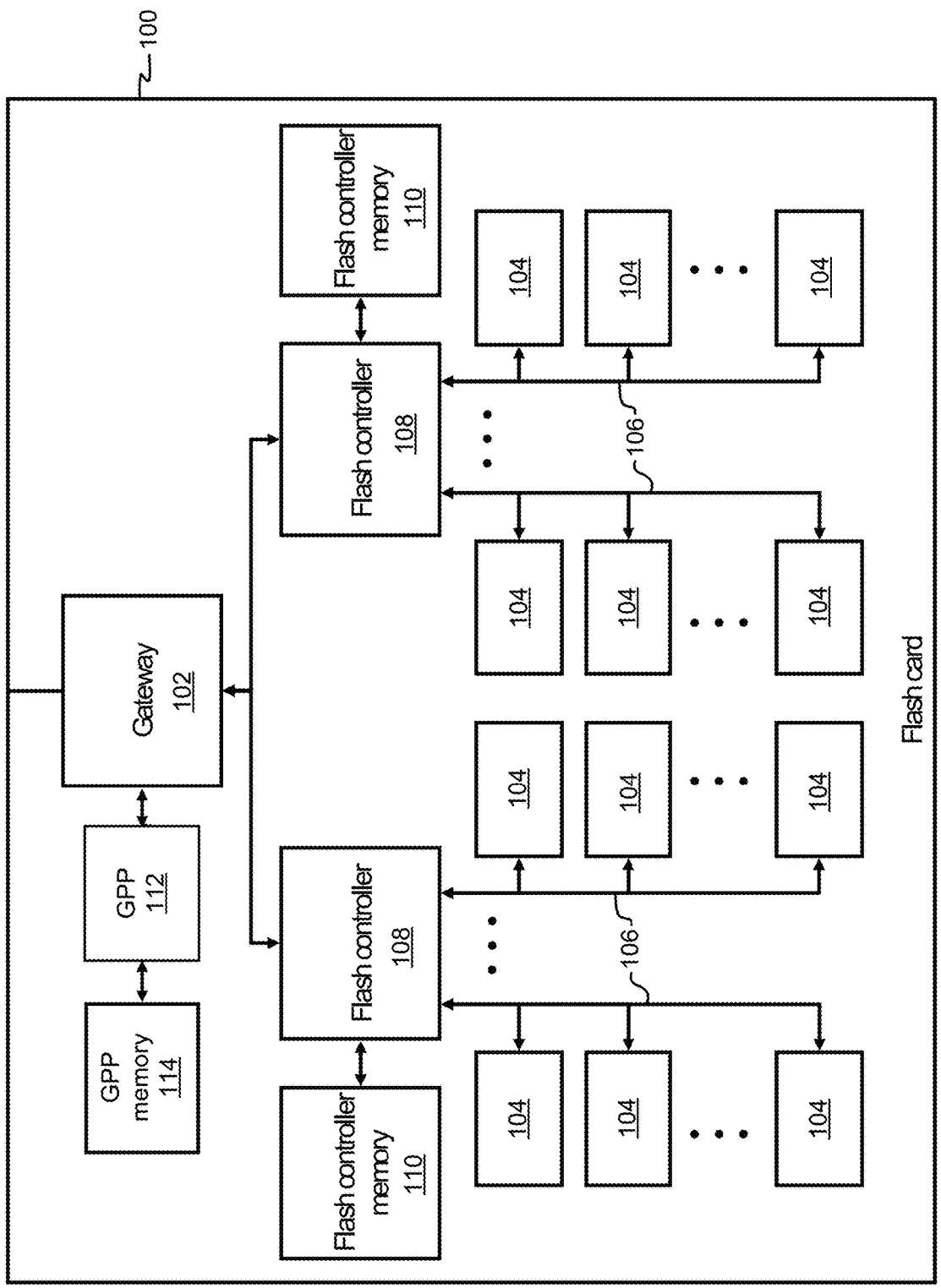
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method is for migrating data between block pools in a storage system. In some approaches the computer-implemented method includes: determining whether a number of blocks included in a ready-to-use (RTU) queue associated with a first block pool is in a first predetermined range. The blocks in the first block pool are configured in single-level cell (SLC) mode, while blocks in a second block pool are configured in multi-bit-per-cell mode. In response to determining that the number of blocks included in the RTU queue is not in the first predetermined range, a determination is made as to whether a current input/output (I/O) workload experienced by the storage system is in a second predetermined range. In response to determining that the current I/O workload is in the second predetermined range, for each block in the first block pool: a determination is made as to whether an amount of metadata associated with the pages in the given block is greater than a predetermined threshold. In response to determining that the amount of metadata associated with the pages in the given block is greater than the predetermined threshold, a subset of pages in the given block are selected. Moreover, data is relocated from the selected subset of pages in the given block to a block in the second block pool.

In another general embodiment, a computer program product is for migrating data between block pools in a storage system. The computer program product includes a computer readable storage medium having program instructions embodied therewith. Moreover, the program instructions are readable and/or executable by a processor to cause the processor to: perform the foregoing method.

In yet another general embodiment, a system includes: a plurality of non-volatile random access memory (NVRAM) blocks configured to store data, a processor, and logic integrated with and/or executable by the processor for migrating data between block pools in a storage system. Moreover, the logic is configured to: perform the foregoing method.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
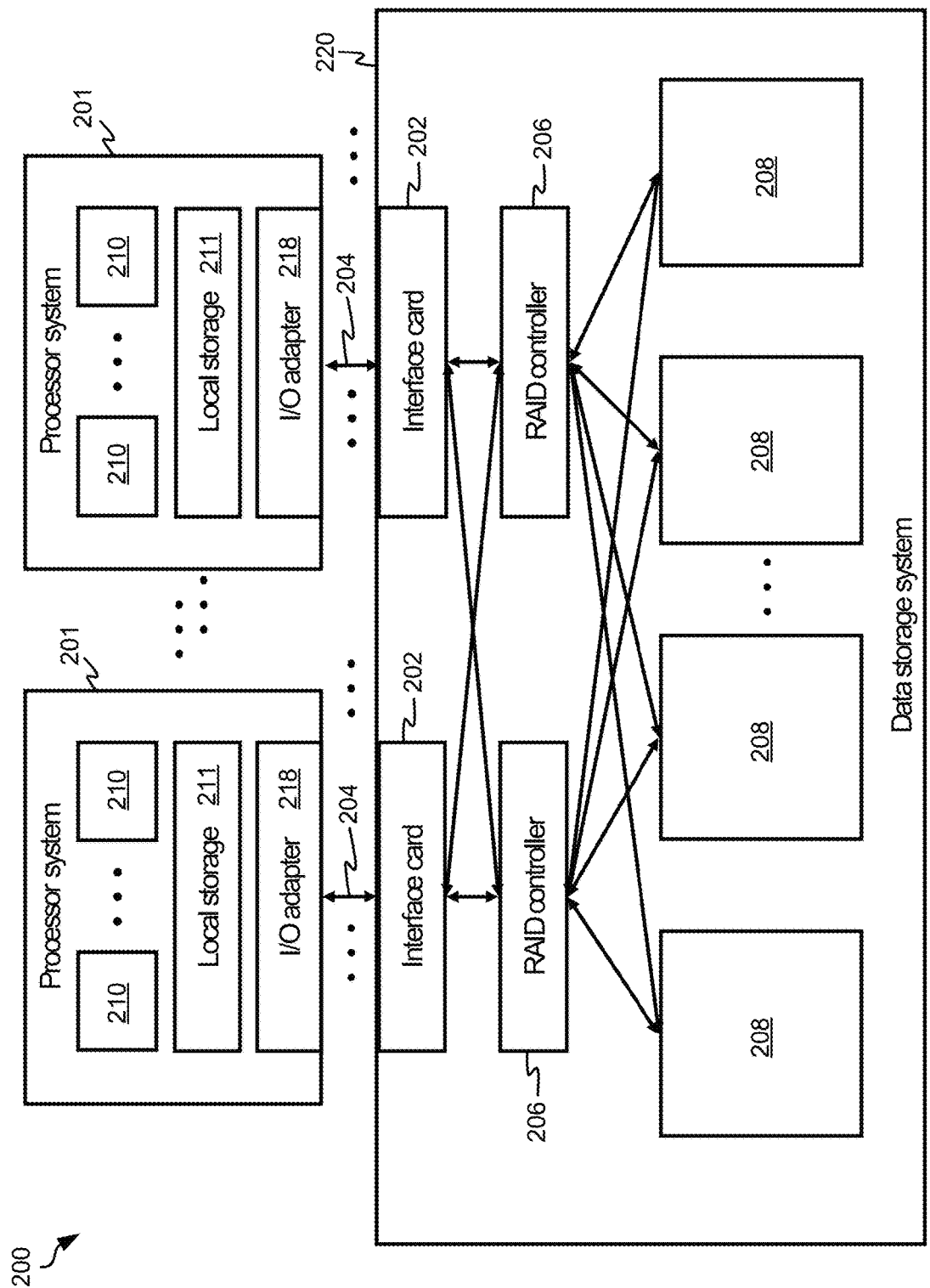
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 914 of FIG. 9, ROM 916 of FIG. 9, etc.), and an I/O adapter 218 configured to communicate with the data storage system 220.

Referring again to FIG. 1, memory controllers 108, GPP 112, and/or other controllers described herein (e.g., RAID controllers 206 of FIG. 2) may be able to perform various functions on stored data, depending on the desired embodiment. Specifically, memory controllers or GPP 112 may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logical erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 of FIG. 1) and/or GPP 112 may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing write heat separation.

Write Heat Separation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for write heat separation when determining the write heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, write heat separation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of write heat separation is two-fold. First, performing a garbage collection process on a hot memory block will prevent triggering the relocation of cold data as well. In the absence of write heat separation, updates to hot data, which are performed frequently, also results in the undesirable relocations of all cold data collocated on the same LEB as the hot data being relocated. Therefore, the write amplification incurred by performing garbage collection is much lower for embodiments implementing write heat separation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing write heat separation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened by associating one or more erased blocks to the LEB.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB or 16 KiB logical addresses. The memory I/O unit 310 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As alluded to above, physical configurations of memory blocks in non-volatile memory have changed over time. For instance, in the past Flash blocks had a single-bit-per-cell configuration, but improvements in data storage have introduced Flash blocks that implement multi-bit-per-cell configurations. While blocks having multi-bit-per-cell configurations are able to store more information than blocks having a single-bit-per-cell configuration, this increase in storage capacity comes at a price in terms of performance and latency. For example, memory blocks having a single-bit-per-cell configuration experience write latencies that are up to about 10 times lower than experienced by memory blocks having multi-bit-per-cell configurations. Similarly, memory blocks having a single-bit-per-cell configuration experience lower read latencies than memory blocks having multi-bit-per-cell configurations.

This tradeoff between storage capacity versus performance and endurance allows for storage systems to tailor the performance capabilities of memory to some extent. For instance, a storage system predicted to have a high amount of I/O traffic or program/erase (P/E) cycles is able to selectively use a greater number of memory blocks having a single-bit-per-cell configuration than those having multi-bit-per-cell configurations. Conversely, a storage system predicted to store a large amount of cold data is able to selectively use a greater number of memory blocks having multi-bit-per-cell configurations than those having a single-bit-per-cell configuration.

While the difference in performance characteristics between the different memory block configurations may be utilized to adapt to the given workload, this is only possible when enough free memory blocks are available for writing new data and/or data relocations. However, in many scenarios, depending on the dynamic properties of the workload and the internal state of the controller, higher latencies are experienced by conventional procedures due to starvation of blocks that are available to store data.

In sharp contrast to these shortcomings experienced by conventional procedures and systems, various ones of the embodiments included herein implement procedures which are able to efficiently destage data from memory blocks configured in single-bit-per-cell mode to blocks configured in multi-bit-per-cell mode. Moreover, by preforming this data destaging during idle periods, some of the approaches included herein are able to improve read performance, write performance, device endurance, etc., e.g., as will be described in further detail below.

Figure 5:
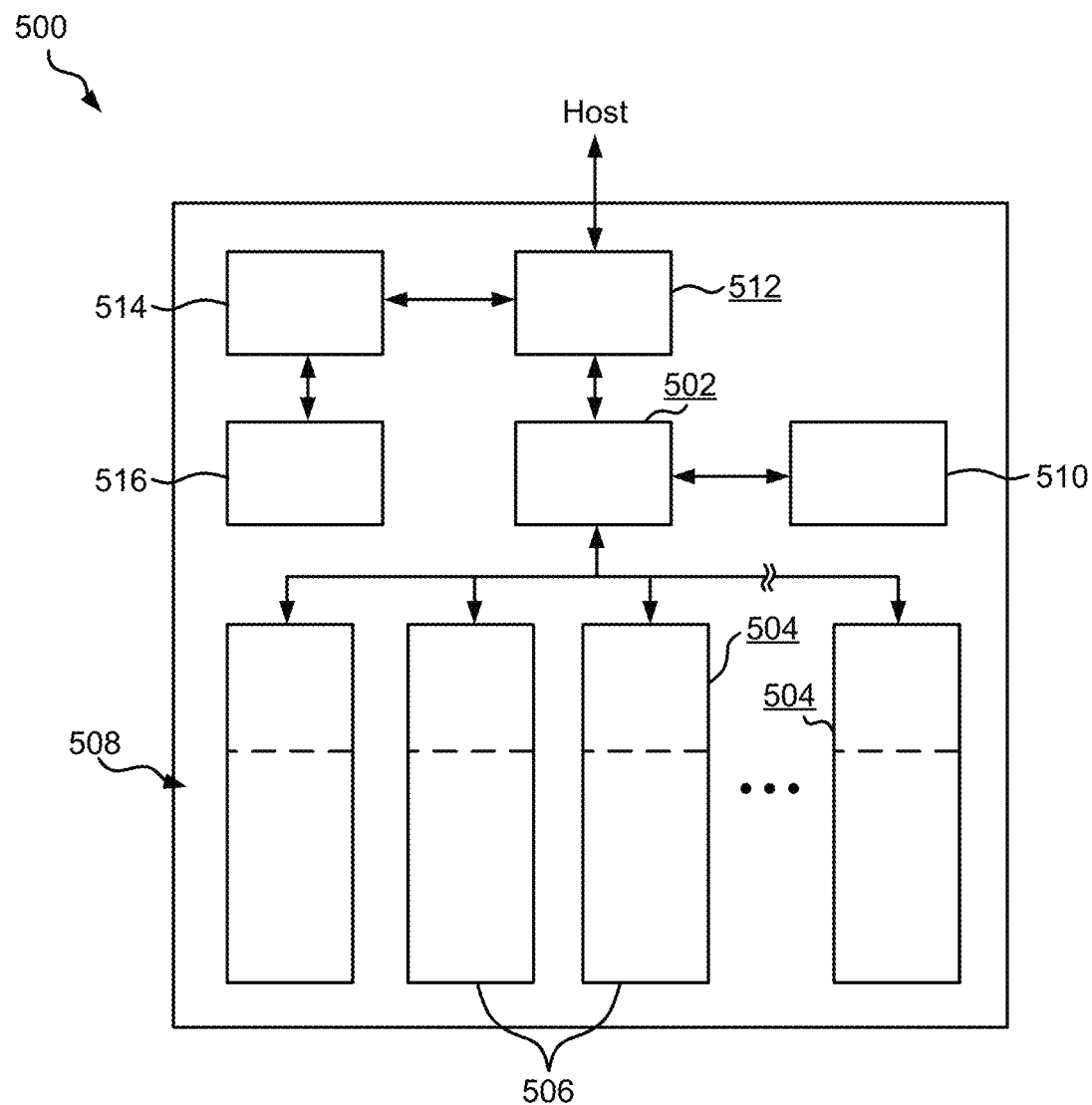
FIG. 5 is a representational view of a non-volatile memory module, in accordance with one embodiment.

Looking now to FIG. 5, a non-volatile memory module 500 having a hybrid controller 502 is illustrated in accordance with one embodiment. As an option, the present memory module 500 may be implemented in conjunction with features from any other embodiment listed herein, such as those described with reference to the other FIGS. However, such memory module 500 and others presented herein may be used in various applications and/or in permutations which may or may not be specifically described in the illustrative embodiments listed herein. Further, the memory module 500 presented herein may be used in any desired environment. Thus FIG. 5 (and the other FIGS.) may be deemed to include any possible permutation.

As noted above, the memory module 500 includes a hybrid controller 502 which is capable of managing and/or adapting blocks which are configured in single-bit-per-cell mode (also referred to herein as "single-level cell mode", or "SLC mode") as well as multi-bit-per-cell mode. According to some approaches, the hybrid controller 502 manages the different block configurations by splitting them into two different pools 504, 506. One of these pools 504 is designated as including those blocks which are configured in SLC mode, while the other pool 506 includes the blocks configured in multi-bit-per-cell mode.

Each of the pools 504, 506 extend across a number of data storage components (e.g., NVRAM memory modules such as NAND Flash memory devices) which together serve as a memory array 508. It follows that the various components illustrated in FIG. 5 function as a memory card and may implement any of the approaches described above with respect to memory card 100 of FIG. 1.

Referring still to FIG. 5, the hybrid controller 502 is also coupled to a cache memory 510 as well as a gateway 512 which receives data commands from one or more hosts, storage systems, running applications, etc. The gateway 512 is in turn coupled to a GPP 514 and GPP memory 516. As mentioned above, the GPP 514 may be of any desired type, e.g., such as an ASIC, FPGA, CPU, etc. Similarly, the GPP memory 516 may be of any desired type, e.g., such as RAM, ROM, battery-backed DRAM, phase-change memory PC-RAM, MRAM, STT-MRAM, etc., and/or combinations thereof.

It follows that the hybrid controller is able to store data that is frequently accessed (e.g., read, rewritten, appended to, etc.) in blocks that are configured in SLC mode and therefore included in the first pool 504, while data that is accessed less frequently is stored in blocks that are configured in multi-bit-per-cell mode and therefore included in the second pool 506. As a hybrid controller can be used to route user writes to blocks that are configured in SLC mode first, while only still valid data is destaged to multi-bit-per-cell blocks later in the background, thereby significantly reducing the number of writes operations performed on blocks in the second pool such that overall endurance is increased. This storage scheme achieves an efficient use of the different blocks of memory and their respective performance characteristics. However, as the ratio of hot and cold data stored in the memory module 500 fluctuates over time, each of the respective pools 504, 506 may be underutilized and/or overutilized.

The hybrid controller 502 is able to selectively reconfigure any of the blocks in the first and/or second pools 504, 506 to dynamically adapt based on actual utilization and/or workload properties. For instance, memory blocks in pool 504 which are configured in SLC mode are able to tolerate higher write amplifications than memory blocks that are configured in multi-bit-per-cell mode and included in pool 506. It follows that write amplification, which is able to directly impact user performance, may have an effect on how and/or where data is stored in memory.

The hybrid controller 502 is also able to migrate data selectively between blocks which correspond to either of the block pools 504, 506 included in the memory module 500. In other words, the hybrid controller 502 is able to adjust an amount of data that is currently stored in each of the block pools by relocating data therebetween based on the given situation, e.g., according to any of the approaches described herein.

Figure 6A:
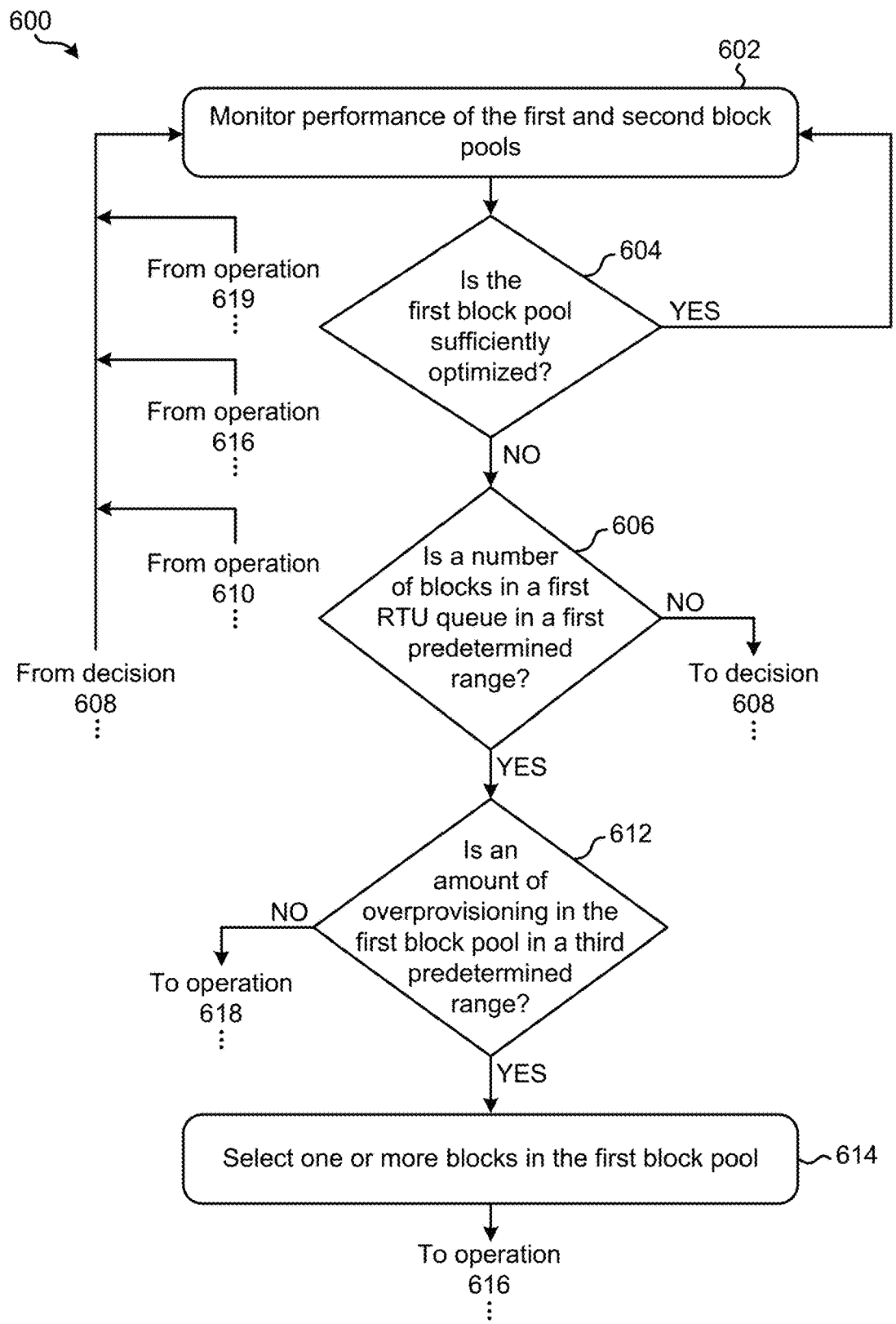
FIG. 6A is a flowchart of a method, in accordance with one embodiment.
Figure 6A:
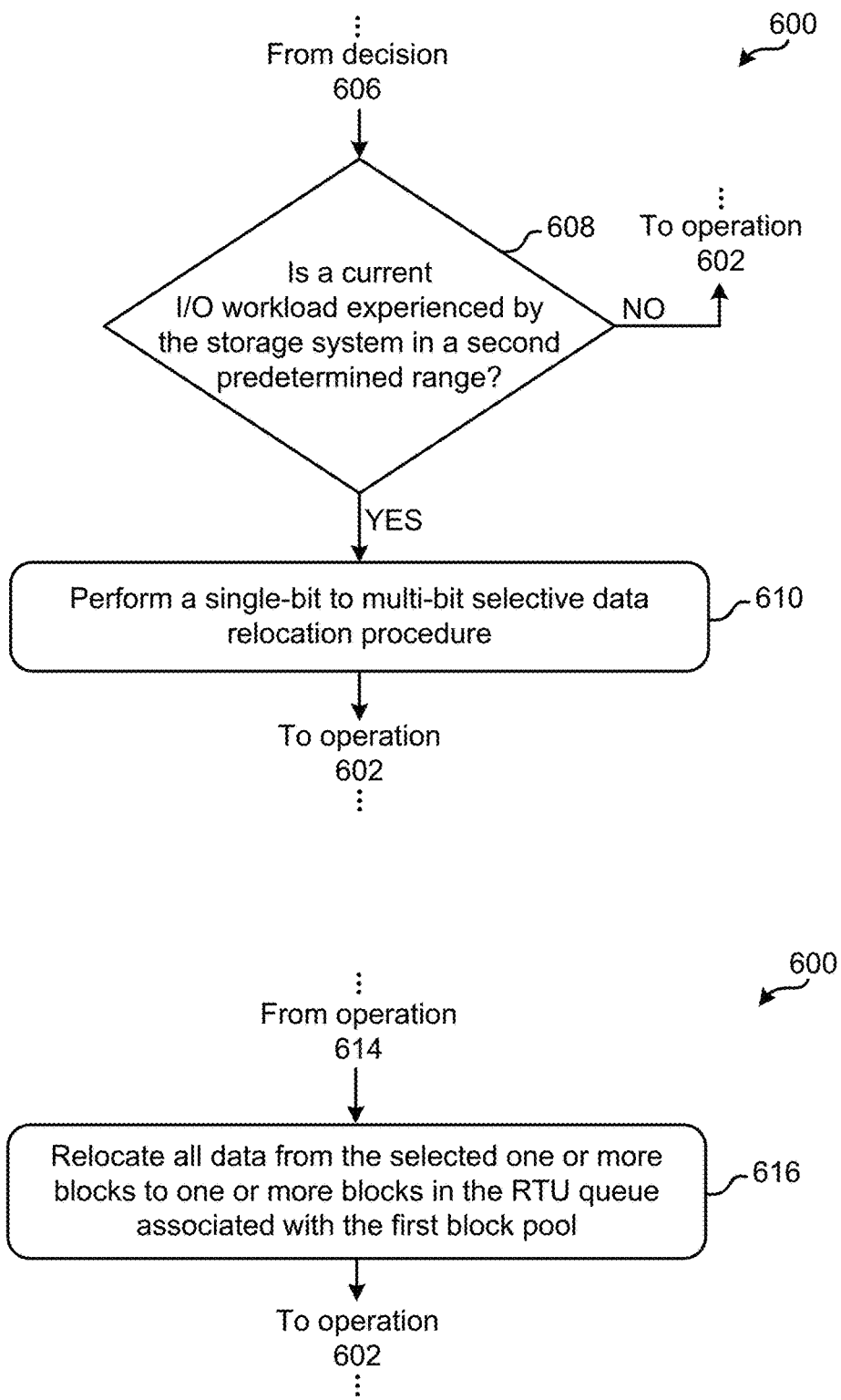
Figure 6A:
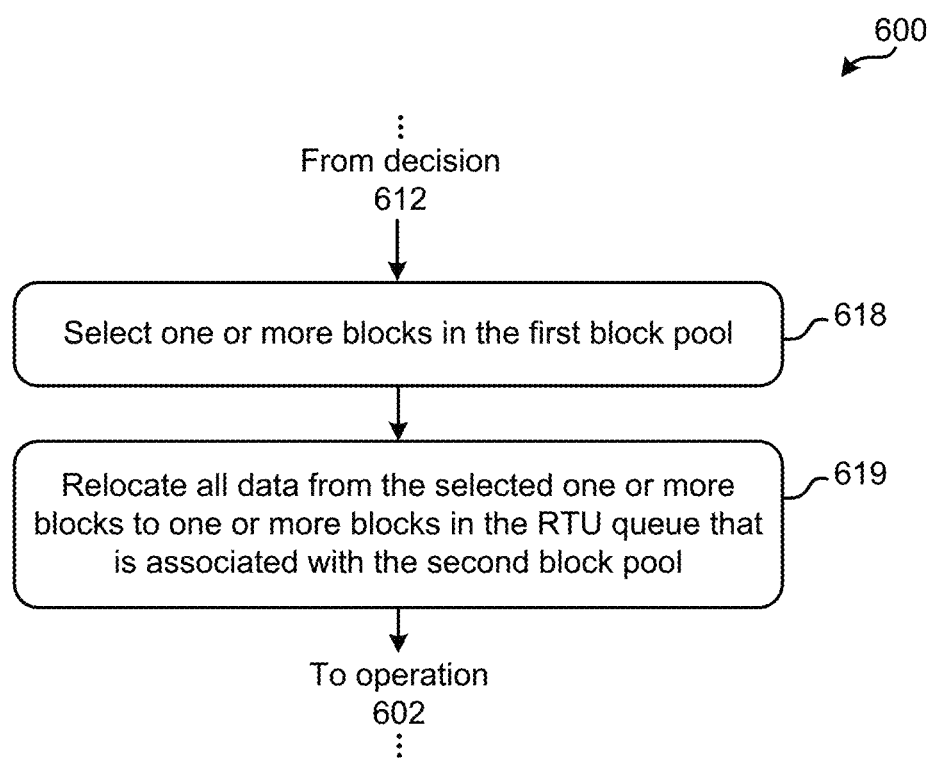

For instance, looking now to FIG. 6A, a method 600 for migrating data between block pools in a storage system is shown according to one embodiment. The method 600 may be performed in accordance with the present invention in any of the environments depicted in FIGS. 1-5, among others, in various embodiments. Of course, more or less operations than those specifically described in FIG. 6A may be included in method 600, as would be understood by one of skill in the art upon reading the present descriptions. For instance, the various processes included in method 600 are described below in the context of transitioning data from memory blocks in a first pool which are configured in SLC mode, to blocks in a second pool which are configured in multi-bit-per-cell mode. However, any one or more of the various processes included in method 600 may be applied in the context of transitioning data from memory blocks configured in multi-bit-per-cell mode to blocks that are configured in SLC mode.

Each of the steps of the method 600 may be performed by any suitable component of the operating environment. For example, in various embodiments, the method 600 may be partially or entirely performed by a hybrid controller, a controller, a processor, a computer, etc., or some other device having one or more processors therein. Thus, in some embodiments, method 600 may be a computer-implemented method. In such embodiments, the computer used to implement the method may include a memory module itself or a portion thereof, e.g., such as the hybrid controller. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6A, operation 602 of method 600 includes monitoring performance of the first and second block pools. Performance may be monitored by analyzing and/or collecting metadata, computing metrics based on achieved performance, etc. Moreover, decision 604 includes determining whether the first block pool is sufficiently optimized. With respect to the present description, "optimized" is intended to refer to the overall performance of the blocks in the first pool. In some approaches this decision may be made by evaluating metadata associated with the blocks in the first pool, and determining whether the read heats experienced by the blocks in the first pool are sufficiently uniform. In other approaches, the determination may be made based on whether the write heats experienced by the various blocks in the first pool are sufficiently uniform.

In other words, the outcome of decision 604 may depend on whether enough metadata is available to properly evaluate performance across the various blocks in memory. Accordingly, in some approaches decision 604 includes determining whether an amount of metadata associated with the pages in the given block is greater than a predetermined threshold. Depending on the approach, the threshold may be predetermined by a user, by a system administrator, by a storage controller based on performance, etc.

As shown, method 600 returns to operation 602 in response to determining that the first block pool is sufficiently optimized. As a result, method 600 is able to continue monitoring performance of the first and second block pools. However, in response to determining that the first block pool is not sufficiently optimized, method 600 proceeds to decision 606. There, decision 606 includes determining whether a number of blocks included in a first ready-to-use (RTU) queue associated with the first block pool is in a first predetermined range. The first range may be predetermined by a user, based on industry standards, by component capabilities, etc. It should be noted that "in a first predetermined range" or any of the predetermined ranges included herein are in no way intended to limit the invention. Rather than determining whether a value is in a predetermined range, equivalent determinations may be made, e.g., as to whether a value is above a threshold, whether a value is outside a predetermined range, whether an absolute value is above a threshold, whether a value is below a threshold, etc., depending on the desired approach. It should also be noted that instead of a single RTU queue being associated with the first block pool, in some embodiments there can be a plurality of RTU queues being associated with each block pool, as can be appreciated by those skilled in the art. This can be beneficial for example to improve parallelism, simplify management, etc.

An RTU queue is used to store blocks of memory which are unassigned (e.g., empty) and ready to have data written thereto. Thus, in some approaches, decision 606 may be made by evaluating the size of the first RTU queue and/or the size of a second RTU queue which corresponds to the second block pool. Each of the first and second RTU queues include memory blocks which are incorporated in first and second pools of memory blocks, respectively. Moreover, each of the first and second pools include memory blocks which are configured in different modes. As mentioned above, the first pool includes memory blocks configured in SLC mode while the second pool includes memory blocks configured in multi-bit-per-cell mode. It follows that the first RTU queue includes memory blocks configured in SLC mode, while the second RTU queue includes memory blocks configured in multi-bit-per-cell mode. Depending on the approach, the blocks in the second pool that are configured in multi-bit-per-cell mode may have a number of different configurations.

For instance, in some approaches the blocks in the second pool that are configured in multi-bit-per-cell mode are configured in multi-level cell (MLC) mode, while in other approaches the blocks in the second pool that are configured in multi-bit-per-cell mode are configured in triple-level cell (TLC) mode. In other approaches, the blocks in the second pool that are configured in multi-bit-per-cell mode are configured in quad-level cell (QLC) mode, and each of the blocks configured in QLC mode include lower pages, upper pages, extra pages, and top pages. In still other approaches, the blocks in the second pool that are configured in multi-bit-per-cell mode are configured in penta-level cell (PLC) mode.

With respect to the present description, the "size" of a given RTU queue is intended to represent the number of erased memory blocks that are included therein. Initially, when no data is written to the device, the size of an RTU queue represents the overall storage capacity as all blocks are erased and placed in the RTU queue according to their mode. Over time, as data is written to the non-volatile memory module, new LEBs for data placement are opened by taking blocks from the respective RTUs, which reduces their size. At some point, the opening and closing of LEBs results in a low queue level in any of the RTUs at which point garbage collection is executed. The size of the RTU may be represented by (e.g., quantified using) a number of blocks included in the RTU queue, the combined storage capacity of the blocks included in the RTU queue, a percentage of the overall number of blocks included in the overarching system that are included in the RTU queue, etc. According to some approaches, the size of the first and/or second RTU queues are evaluated by actually inspecting the queues themselves, retrieving the information from a counter, a lookup table, looking through an operations log, etc.

Again, decision 606 includes determining whether a number of blocks included in the first RTU queue associated with the first block pool is in a first predetermined range. It follows that this first predetermined range is specific to the first RTU queue in preferred approaches. However, in some approaches the first range may be the same or similar for the first RTU queue as well as the second RTU queue. The first RTU queue also preferably corresponds to a garbage collection threshold of the first RTU queue, such that a garbage collection operation is performed in response to determining that the number of blocks included in the first RTU queue is undesirably low, e.g., as will soon become apparent.

In response to determining that the number of blocks included in the first RTU queue is not in the first predetermined range, method 600 advances from decision 606 to decision 608. In other words, method 600 advances from decision 606 to decision 608 in response to determining that the first block pool includes a sufficient number of blocks in the respective RTU queue. There, decision 608 includes determining whether a current input/output (I/O) workload experienced by the storage system is in a second predetermined range. In other words, decision 608 includes determining whether an amount of available processing bandwidth is undesirably low. In some approaches this determination is based on a percentage of unused bandwidth for the overarching storage system, e.g., as would be appreciated by one skilled in the art after reading the present description. In some approaches the I/O load is computed based on information pertaining to NAND bandwidth utilization, e.g., as reported by a FPGA and/or ASIC NVM controller in the storage system.

During times when I/O workloads experienced by the storage system and/or any of the components included therein is undesirably high, it is preferred that data migration is minimized. This allows for processing bandwidth to be directed to ongoing read and/or write operations, thereby maintaining efficient performance. Accordingly, in response to determining that the current I/O workload experienced by the storage system is not in the second predetermined range, method 600 returns to operation 602. In other words, in response to determining that the current I/O workload experienced by the storage system is undesirably high, method 600 returns to operation 602 and continues monitoring performance. As a result, no garbage collection procedures are performed as a sufficient number of free blocks are available in the first block pool, and garbage collection procedures would negatively impact host performance.

However, in response to determining that the current I/O workload experienced by the storage system is in the second predetermined range, method 600 proceeds to operation 610. There, operation 610 includes performing a single-bit to multi-bit selective data relocation procedure. This selective data relocation procedure is performed in order to reduce the amount of data stored in the blocks of the first pool and transition that data to the blocks in the second pool. In doing so, method 600 is able to counteract the undesirable aspects of the current memory configuration. For instance, upon reaching operation 610, method 600 has already determined that the first block pool is not sufficiently optimized, and the number of blocks included in the first RTU queue is undesirably low. Thus, by selectively transitioning data from blocks in the first pool to blocks in the second pool, operation 610 is desirably able to not only optimize the first block pool, but also effectively increase the number of blocks in the first RTU queue.

Figure 6B:
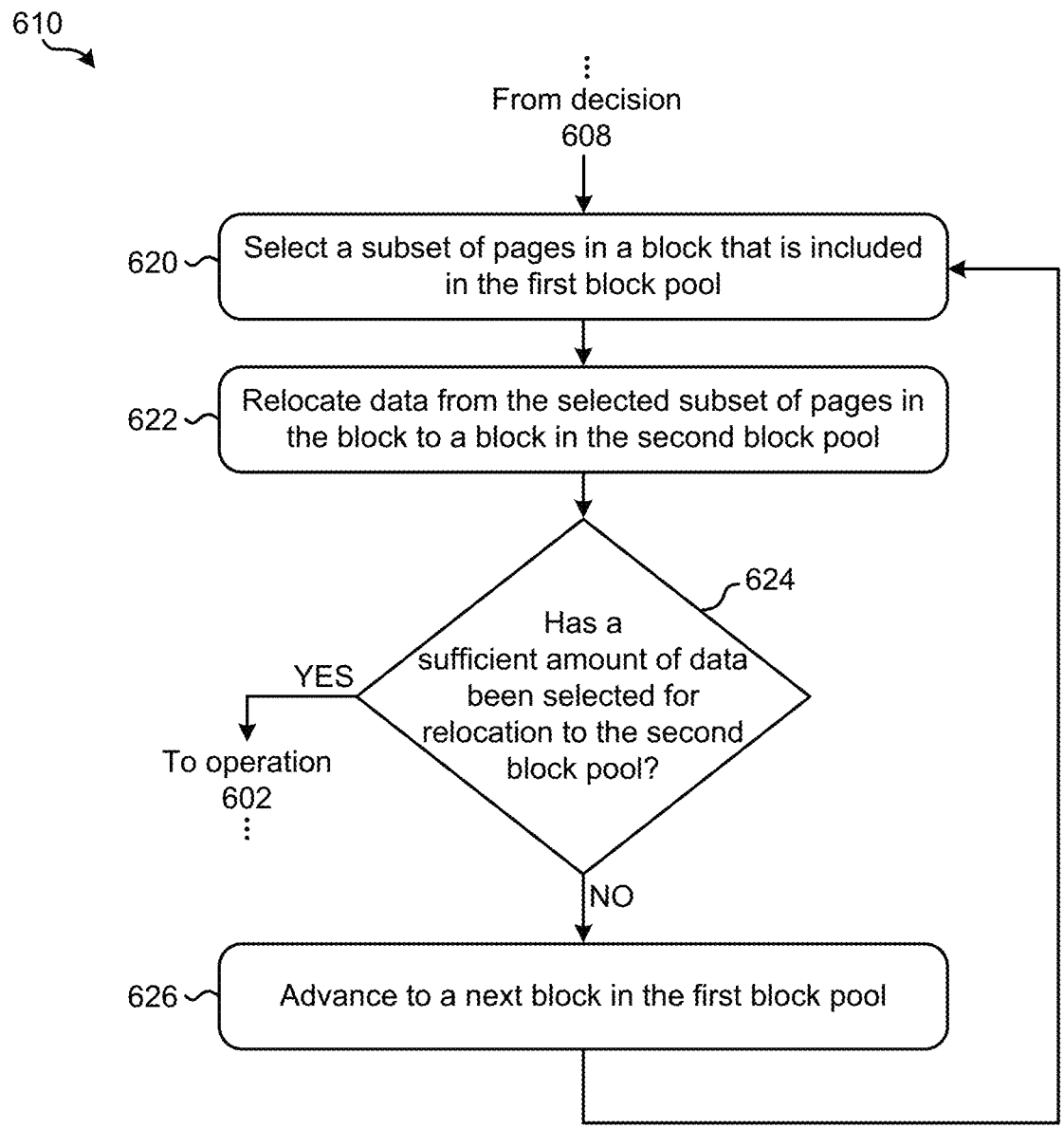
FIG. 6B is a flowchart of sub-processes for one of the operations in the method of FIG. 6A, in accordance with one embodiment.

Referring momentarily to FIG. 6B, exemplary sub-processes of performing a single-bit to multi-bit selective data relocation procedure are illustrated in accordance with one embodiment, one or more of which may be used to perform operation 610 of FIG. 6A. However, it should be noted that the sub-processes of FIG. 6B are illustrated in accordance with one embodiment which is in no way intended to limit the invention.

As noted above, a determination may be made in some approaches as to whether an amount of metadata associated with the pages in the given block is greater than a predetermined threshold. Depending on the approach, the threshold may be predetermined by a user, by a system administrator, by a storage controller based on performance, etc. Accordingly, the process of performing a single-bit to multi-bit selective data relocation procedure may initially include determining whether an amount of metadata associated with the pages in the given block is greater than a predetermined threshold. In response to determining that the amount of metadata associated with the pages in the given block is not greater than a predetermined threshold, the given block may be skipped over and revisited at a later point in time.

However, in response to determining that the amount of metadata associated with the pages in the given block is greater than a predetermined threshold, the flowchart may advance to sub-operation 620. There, sub-operation 620 includes selecting a subset of pages in a block that is included in the first block pool. The data that is included in the pages selected in sub-operation 620 will eventually be relocated to a block included in the second block pool. Thus, sub-operation 620 effectively includes selecting data that is to be transferred to the second block pool. The selections performed in sub-operation 620 are preferably able to reduce future relocation overhead by selectively relocation partial blocks based on criteria other than the number of invalid pages in the given block. In other words, sub-operation 620 preferably selects pages which still currently include valid data. Rather, information pertaining to the read and/or write heat, utilization, performance metrics, etc., of the data in the various pages is evaluated in order to perform the selection of sub-operation 620.

The subset of pages selected from a given block in sub-operation 620 are preferably selected based on the read and/or write heat of the data stored therein. In other words, sub-operation 620 preferably includes evaluating the read and/or write heat of the data in each of the pages in the SLC block currently being examined. As noted above, memory blocks configured in SLC mode experience write latencies that are up to about 10 times lower than experienced by memory blocks having multi-bit-per-cell configurations. Similarly, memory blocks configured in SLC mode experience lower read latencies than memory blocks having multi-bit-per-cell configurations. Accordingly, the memory having a SLC configuration is able to read and/or write the data with less latency and/or greater throughput than would be achievable for memory having a multi-bit-per-cell configuration.

In an effort to take advantage of these performance discrepancies, it is preferred that the pages selected in sub-operation 620 include data which has a relatively low write heat, e.g., at least in comparison to the write heat of data in the other pages in the block. This allows for write hot data to remain stored in the blocks configured in SLC mode (again which experience lower read and write latencies), while data having lower write temperatures are transitioned to the blocks configured in multi-bit-per-cell mode (again which experience higher read and write latencies). In some approaches a drive utilization ratio may also be used to select the subset of pages in sub-operation 620. It follows that various types of information (e.g., performance statistics, metadata, etc.) may be evaluated in selecting the subset of pages in a given block. Accordingly, blocks holding data for which no metadata is available may simply not be eligible for selection and may thereby be skipped over until at least some metadata is available.

Referring still to FIG. 6B, sub-operation 622 includes relocating data from the selected subset of pages in the block to a block in the second block pool. More specifically, the data may be relocated from the subset of pages to a block which is included in the RTU queue that is associated with the second block pool. The information used to perform the selections in sub-operation 620 may further be combined with read heat separation while relocating the data to the second block pool, e.g., in order to desirably maintain both high write and read performance. For instance, desirable write performance may be provided as a result of maintaining sufficient free space in the first block pool which is in sharp contrast to conventional procedures. Write performance may further be improved by implementing write heat separation, thereby reducing write amplification. This is particularly desirable in approaches involving a first block pool which stores a large percentage of the user data that is received.

Desirable read performance may also be accomplished as a result of implementing read heat data separation. For instance, data having higher read heats may desirably be stored in higher performance memory. It follows that in some approaches, sub-operation 622 includes sending one or more instructions to store portions of the data having a higher read heat into higher performance pages in the block configured in multi-bit-per-cell mode. Similarly, one or more instructions to store portions of the data having a lower read heat into lower performance pages in the block may be sent. With respect to the present description, the "higher performance pages" is intended to refer to types of pages which perform more favorably at least with respect to "lower performance pages". It follows that the higher performance pages may include any type of page which exhibits more favorable performance characteristics than other types of pages. While different performance characteristics are desirable depending on the particular situation, according to one example, the two performance levels may correspond to distinguishable latency and/or throughput levels which correspond to the different types of pages. In some approaches, the higher performance pages include lower pages and/or upper pages in three dimensional (3D) quad-level cell (QLC) NAND Flash blocks, while the lower performance pages include extra pages and top pages in 3D QLC NAND Flash blocks.

The flowchart in FIG. 6B further includes determining whether a sufficient amount of data has been selected for relocation to the second block pool. See decision 624. As noted above, selectively transitioning data from blocks in the first pool to blocks in the second pool allows for the first block pool to be reoptimized in addition to effectively increasing the number of blocks in the first RTU queue. However, achieving these desirable results involves transitioning a sufficient amount of data from the first block pool to the second block pool.

Thus, in response to determining that a sufficient amount of data has not yet been selected for relocation to the second block pool, the flowchart proceeds to sub-operation 626 before returning to sub-operation 620 such that the sub-processes in FIG. 6B may be repeated. There, sub-operation 626 includes advancing to a next block in the first block pool such that it may be examined for data to transfer to the second block pool. From sub-operation 626, the flowchart returns to sub-operation 620. It follows that any desired number of blocks in the first block pool may experience the single-bit to multi-bit selective data relocation procedure. However, in response to determining that a sufficient amount of data has been selected for relocation to the second block pool, the flowchart returns to operation 602 of FIG. 6A as shown.

It should be noted that the sub-processes included in FIG. 6B are preferably repeated in an iterative fashion until a full target multi-bit stripe is written. In other words, the amount of data relocated from blocks in the first pool to blocks in the second pool as a result of repeating the sub-processes included in FIG. 6B is preferably able to fill a multi-bit stripe in a block of the second pool, e.g., as would be appreciated by one skilled in the art after reading the present description. It follows that the garbage collection procedures described in the various approaches included herein are able to effectively increase the amount of invalid data in the SLC blocks in the first block pool, thereby desirably reducing future garbage collection overhead, and improving overall performance as well as endurance.

Returning now to decision 606 in FIG. 6A, method 600 proceeds to decision 612 in response to determining that the number of blocks included in the RTU queue is in the first predetermined range. In other words, method 600 advances to decision 612 in response to determining that the first block pool does not include a sufficient number of blocks in the respective RTU queue. This situation may result from a few different factors. For instance, in some approaches a low number of blocks in the RTU queue may be caused by the blocks having a high percentage of invalid data included therein. In other approaches the block pool may simply be experiencing high utilization. Accordingly, decision 612 includes determining whether an amount of overprovisioning present in the first block pool is in a third predetermined range. In other words, decision 612 includes determining whether the first block pool has a sufficient (e.g., desirable) amount of overprovisioning.

In response to determining that the amount of overprovisioning present in the first block pool is in the third predetermined range, method 600 proceeds to operation 614. There, operation 614 includes selecting one or more blocks in the first block pool, while operation 616 includes relocating all data from the selected one or more blocks to one or more blocks in the RTU queue associated with the first block pool. In other words, operations 614 and 616 include selecting entire blocks from the first block pool and relocating the data from the selected blocks, and back into other ones of the blocks in the first block pool. The relocation process preferably continues until a full target multi-bit stripe has been filled (e.g., written). Accordingly, operations 614 and 616 are able to improve the rate at which SLC blocks can be freed, specifically by freeing entire SLC blocks at a time.

In preferred approaches, the process of relocating all data from the selected one or more blocks involves performing data placement based on write heat of the data. Accordingly, the blocks that are selected for relocation are preferably selected based on read and/or write recency. Moreover, a percentage of invalid data included therein may also be taken into consideration. For example, blocks may be selected for relocation based on a least recently used policy and/or an "n-bin" garbage collection policy, e.g., as would be appreciated by one skilled in the art after reading the present description. Complete SLC blocks are freed and erased as quickly as possible. Moreover, it should be noted that the predetermined range which corresponds to the SLC RTU level maybe be different from a predetermined range which corresponds to the RTU associated with the second block pool, e.g., in view of the better performance and/or endurance experienced by blocks configured in SLC mode. Furthermore, by avoiding situations which involve destaging data to blocks having different configurations unnecessarily, method 600 is able to significantly improve performance, increase endurance, accumulate more accurate read heat statistics, etc.

Returning to decision 612, method 600 proceeds to operation 618 in response to determining that that the amount of overprovisioning present in the first block pool is not in the third predetermined range. There, operation 618 includes selecting one or more blocks in the first block pool, while operation 619 includes relocating all data from the selected one or more blocks to one or more blocks in the RTU queue that is associated with the second block pool. It follows that in response to determining that the first block pool does not have a sufficient amount of overprovisioning, method 600 is able to select blocks for relocation in an effort to increase the number of available blocks in the first block pool. As noted above, the blocks are preferably selected based on read and/or write recency. Moreover, the percentage of invalid data included in each of the blocks may be evaluated in determining whether the data in a given block should be relocated to the second block pool.

It should be noted that the process of relocating data from a selected block as described herein preferably involves performing a garbage collection, e.g., as would be appreciated by one skilled in the art after reading the present description. For instance, the garbage collection processes will relocate valid data from the block such that the block may be placed in an RTU queue which corresponds to the given pool, thereby increasing the number of available blocks that are included therein. It follows that in some approaches, the block having the most invalid data therein of all the blocks in the respective pool may be selected. However, any other desired factors may be considered in the process of selecting one of the blocks in the first pool to undergo a garbage collection process. For instance, an age of each of the blocks, an amount of valid data included in each of the blocks, read and/or write heat of the data included therein, etc. may be considered when selecting on the of the blocks in the first pool.

Relocating the valid data from the selected block may further be performed in any desired manner. For instance, the valid data may be temporarily stored in a cache (e.g., see cache memory 510 in FIG. 5) before being stored in a different block of memory in some approaches. In other approaches, the valid data may be transferred to another block of memory directly. Moreover, in response to relocating the valid data from a selected block, the selected block is erased.

The selected (and now erased) block may thereby be placed in an appropriate RTU queue. As mentioned above, each of the RTU queues include memory blocks which are incorporated in one of the pools of memory blocks. Accordingly, by performing a garbage collection operation on a selected block and placing it in the an RTU queue, the selected block is effectively used to help fill the RTU queue. This desirably avoids latency issues by ensuring that a predetermined number of available (e.g., empty) blocks are included in the RTU queue.

Figure 7A:
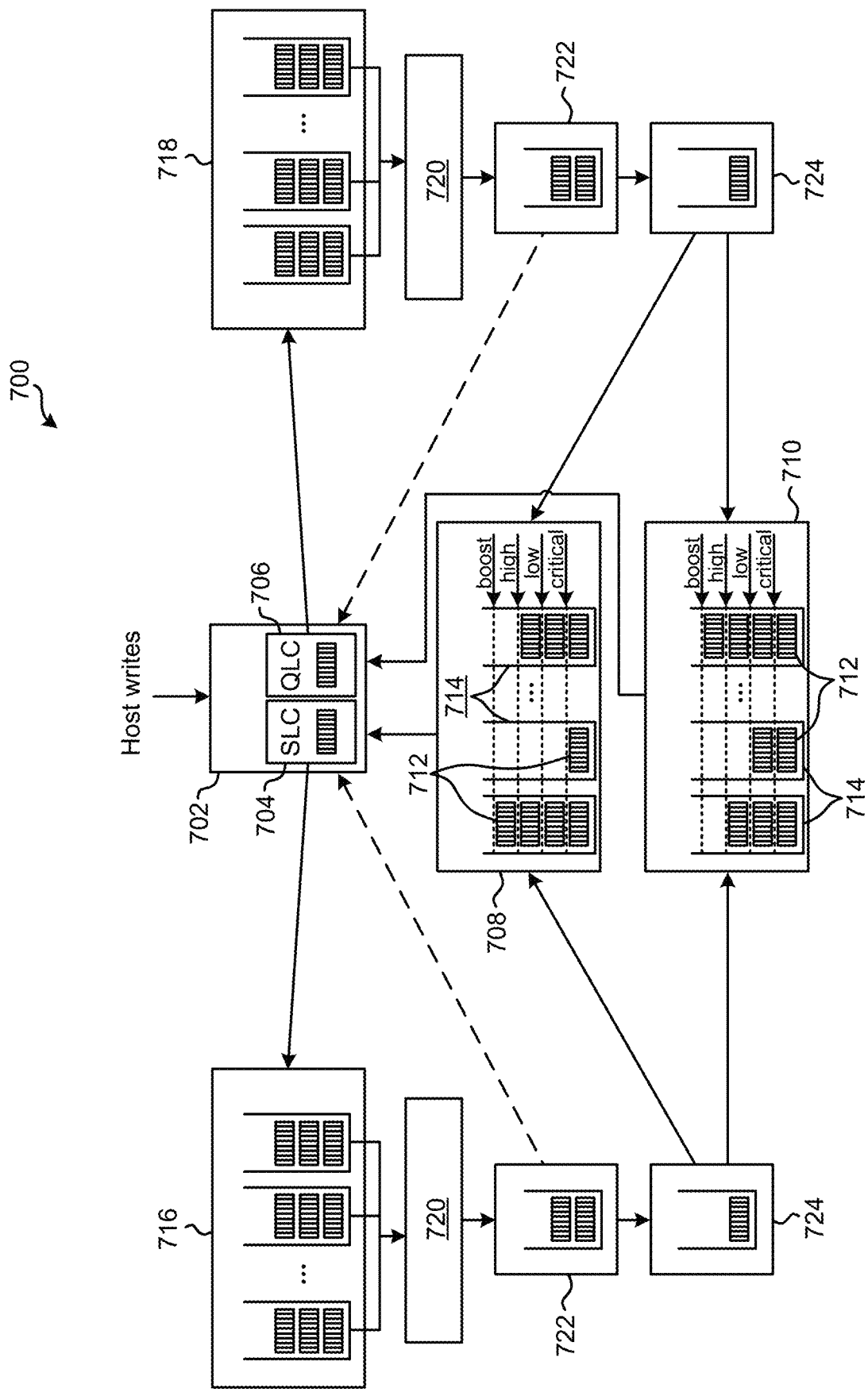
FIG. 7A is a partial representational view of a data and block flow overview, in accordance with one embodiment.

Referring now to FIG. 7A, a data and block flow overview 700 is illustrated in accordance with one embodiment. As an option, the present data and block flow overview 700 may be implemented in conjunction with features from any other embodiment listed herein, such as those described with reference to the other FIGS., such as FIGS. 6A-6B. However, such data and block flow overview 700 and others presented herein may be used in various applications and/or in permutations which may or may not be specifically described in the illustrative embodiments listed herein. Further, the data and block flow overview 700 presented herein may be used in any desired environment. Thus FIG. 7 (and the other FIGS.) may be deemed to include any possible permutation.

As shown, host writes are received by a data placement module 702 which includes a LEB 704 consisting of one or more blocks of memory that is configured in SLC mode as well as a LEB 706 consisting of one or more blocks of memory configured in multi-bit-per-cell mode. New data is first written to LEBs with blocks configured in SLC mode in some approaches, thereby allowing for the new data to benefit from the lower latencies and higher throughput associated with blocks in SLC mode (e.g., compared to blocks configured in multi-bit-per-cell mode). However, in situations involving high host and internal write loads, new data may be stored directly in blocks that are configured in multi-bit-per-cell mode. Blocks configured in SLC mode are received from a first set of RTU queues 708, while blocks configured in multi-bit-per-cell mode are received from a second set of RTU queues 710. Each of the first and second set of RTU queues 708, 710 include a plurality of memory blocks 712, each of which are accumulated in RTU queues 714 for different planes and channels, e.g., as would be appreciated by one skilled in the art after reading the present description.

Each of the RTU queues 714 associated to a plane and channel and being included in the first and second set of RTU queues 708, 710 are depicted as having a number of different thresholds which correspond to the number of memory blocks that are included in the respective RTU queue 714. One of these thresholds is a boost threshold which may be used in some approaches to determine whether the respective RTU queue and/or specific channel have an undesirably low number of memory blocks included therein. "High", "low", and "critical" thresholds are also implemented in the present embodiment, each of which signify a different fill level for the respective channels in the first and second set of RTU queues 708, 710.

In response to filling a given block or memory with data at the data placement module 702, the LEB is transferred to the respective one of the occupied block queues. Specifically, the LEBs configured in SLC mode are transferred to the SLC occupied block queues 716, while the LEBs configured in multi-bit-per-cell mode are transferred to the multi-bit-per-cell occupied block queues 718. The number of LEBs included in each of the queues 716, 718 changes over time. Therefore, the amount of information stored in (e.g., the effective size of) each of the queues 716, 718 also varies over time.

Over time, LEBs are eventually transitioned from the occupied block queues 716, 718 to the garbage collector and wear leveler modules 720. In some approaches, the LEBs are progressed to the garbage collector and wear leveler modules 720 according to standard garbage collection procedures, which do not necessarily select blocks for garbage collection in the same order in which the blocks were added to the occupied block queues 716, 718. For example, as data in the blocks of a LEB is invalidated over time (e.g., due to rewrite operations, deletions, etc.), the LEB may be specified for garbage collection. However, in other approaches LEBs may be selected and processed by the garbage collector and wear leveler modules 720 according to any of the processes described above with respect to FIGS. 6A-6B. In some embodiments, LEBs may be further selected by the garbage collector or wear leveler based on the retention time or the number of reads the blocks in the LEB have seen, or the measured RBER.

From the garbage collector and wear leveler modules 720, LEBs advance to the data relocation module 722 which sends any valid data extracted from the blocks in the LEB back to the data placement module 702 (as represented by the dashed, arrowed lines). Accordingly, the data may be stored in another available LEB of memory. The blocks in the LEB are thereafter erased by the block erase modules 724. The erase operation may involve specifying the target mode of the block.

Depending on the specified target block mode, erased blocks are returned to the RTU queue which corresponds to the current mode in which the block is configured. However, it should be noted that in some approaches the blocks may be reconfigured. According to an example which is in no way intended to limit the invention, an empty block configured in SLC mode is either returned to an RTU 714 in the first set of RTU queues 708, or reconfigured in multi-bit-per-cell mode before being placed in an RTU 714 in the second set of RTU queues 710. Similarly, an empty block configured in multi-bit-per-cell mode is either returned to an RTU 714 in the second set of RTU queues 710, or reconfigured in SLC mode before being placed in an RTU 714 in the first set of RTU queue 708. Accordingly, each of the block erase modules 724 are depicted as having two arrowed lines extending therefrom, each of these lines representing the possible paths of the blocks that are erased therein.

Figure 7B:
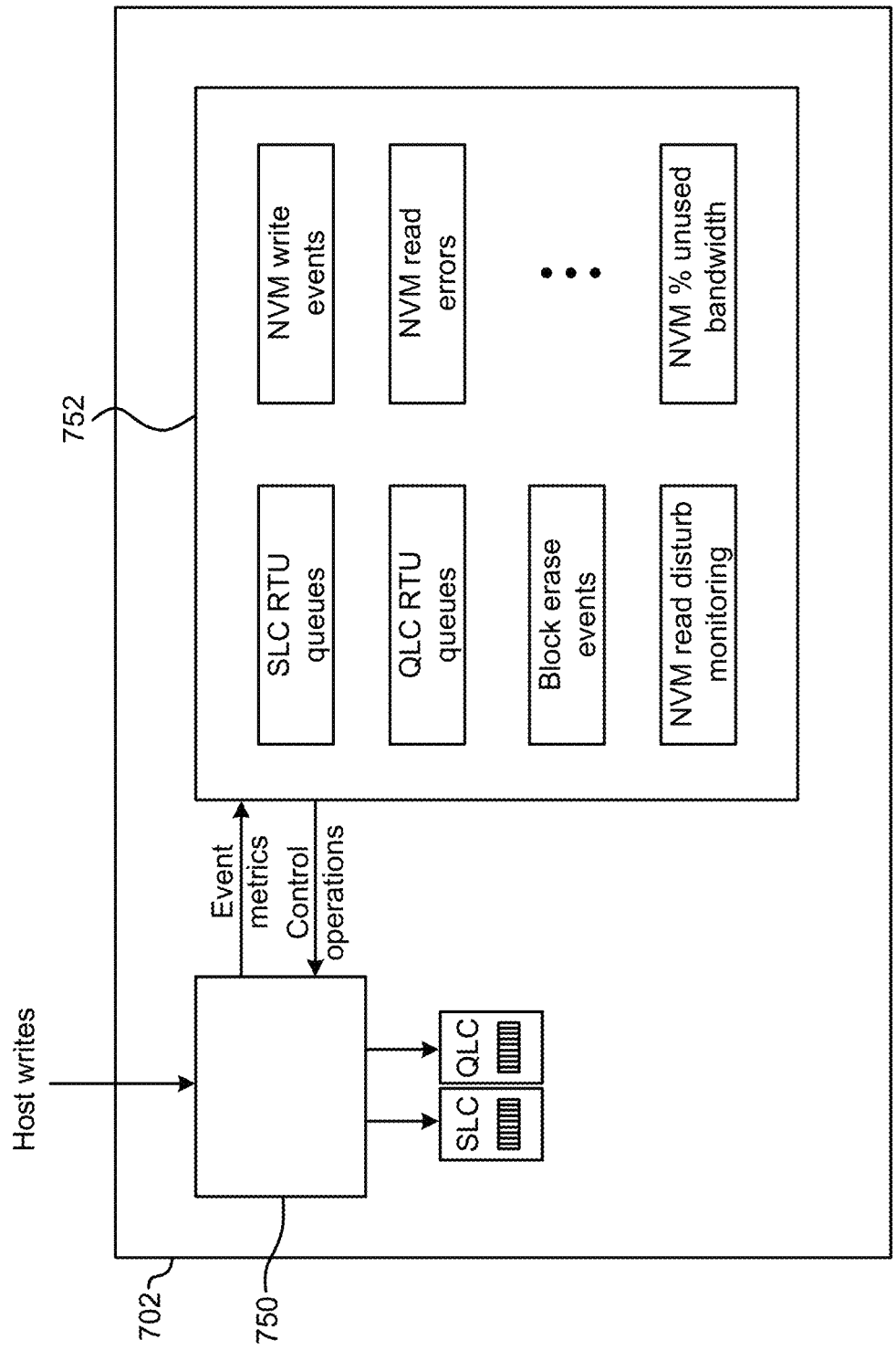
FIG. 7B is a detailed view of the data placement module of FIG. 7A, in accordance with one embodiment.

Looking now to FIG. 7B, a detailed view of the data placement module 702 is illustrated in accordance with one embodiment. As shown, the host writes are received by a controller 750 which is coupled to the LEBs 704, 706 in addition to a controller firmware module 752. According to one illustrative approach, which is in no way intended to limit the invention, the controller 750 is a FPGA controller, while in another illustrative approach the controller 750 is an ASIC controller.

As shown, the controller 750 sends event metrics to the controller firmware module 752 which is preferably stored in the corresponding one of the data regions shown. The event metrics may be used in the process of selecting data to transfer between the different block pools. In sharp contrast to conventional garbage collection schemes, this allows various ones of the approaches included herein to augment the process of performing garbage collection with additional policies to trigger data relocations. In some instances, these additional policies are based on the percentage of memory bandwidth utilization, e.g., as reported by the controller 750. This also achieves consistent quality of service as experienced by host operations, even during data movement from single-bit to the multi-bit pool. One or more utilization thresholds (e.g., a ratio of user data to the memory size) may also be established, although it should be noted that the first block pool of SLC blocks is able to tolerate higher utilization than the second block pool of multi-bit blocks. The ratio between SLC and multi-bit pool write amplification may also be utilized in some approaches.

According to an example, which is in no way intended to limit the invention, the NVM % unused bandwidth event metrics in the controller firmware module 752 is used to evaluate the current I/O workload experienced by the storage system in an attempt to identify situations involving a high percentage of unused bandwidth. In other words, the NVM % unused bandwidth event metrics may be used to detect low I/O workload situations. In such situations, any one of the processes included herein may be implemented in order to improve performance of the system as a whole without negatively effecting ongoing performance.

Referring still to FIG. 7B, the controller firmware module 752 returns control operations to the controller 750 which are used to place the incoming host writes in the LEBs 704, 706, as well as manage data currently stored in a remainder of the blocks in memory (e.g., see occupied block queues 716, 718 in FIG. 7A above).

It follows that various ones of the approaches included herein are able to perform garbage collection procedures which implement a hybrid controller. These procedures desirably target the reduction of future relocation overhead by selectively relocating partial and/or full blocks of data based on criteria other than the number of invalid data in the blocks. For instance, the hybrid controller is able to detect low I/O workloads and perform garbage collection in response to detecting situations in which a low number of free blocks in single-bit mode remain. Moreover, additional data relocations may be performed even when the number of free blocks in single-bit (e.g., SLC) mode is not undesirably low, e.g., in order to increase read performance. This also increases the number of free blocks and/or invalid pages in SLC blocks, thereby reducing the relocation overhead for future garbage collection procedures. By further taking into account the write and/or read heat information which corresponds to data in the SLC pool when performing additional relocations, future relocation overhead may be reduced in addition to improving read performance.

In one embodiment, the aforementioned additional relocations which are performed to reduce future relocation overhead include data relocations from blocks configured in SLC mode to other blocks configured in SLC mode. For instance, these data relocations may be performed on data blocks with insufficient read heat information. The data is gathered from blocks that are configured in single-bit mode and relocated back to the other blocks in the first block pool. The source blocks may be selected based on the percentage of invalid data included therein, but in some approaches the write heat of the data, the block pool utilization, etc., may be considered, e.g., to preemptively prepare for bursts of host writes. Accordingly, various ones of the approaches included herein may be implemented to reduce future relocation overhead by selectively relocating data from single-bit to multi-bit blocks, e.g., if enough space is available in the multi-bit pool.

It should be noted that although various ones of the approaches have been described herein in the context of two memory block pools, any of these approaches may be extended to embodiments having more than two block pools. In such embodiments, the data transfers may further be managed using priorities, based on user input, by comparing the RTU block levels of each respective pool and selecting the pool that has the lowest number of RTU blocks, etc.

It should also be noted that the blocks of memory themselves are not transferred between the first and second block pools. In other words, only the data that is stored in a given block is transferred to another one of the blocks. Data that has been transferred to another block of memory may be marked as invalid. This allows for a garbage collection procedure to identify data in a block that should be conserved, and data which should be discarded in order to make room for new data to be stored in the block experiencing the garbage collection.

Furthermore, although various ones of the approaches included herein have been described in the context of transferring data from blocks configured in SLC mode to blocks configured in multi-bit-per-cell mode, this is in no way intended to limit the invention. For instance, in some approaches, data may be transferred from a block configured in multi-bit-per-cell mode to a block configured in SLC mode, e.g., using any of the processes included herein as would be appreciated by one skilled in the art after reading the present description.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 8:
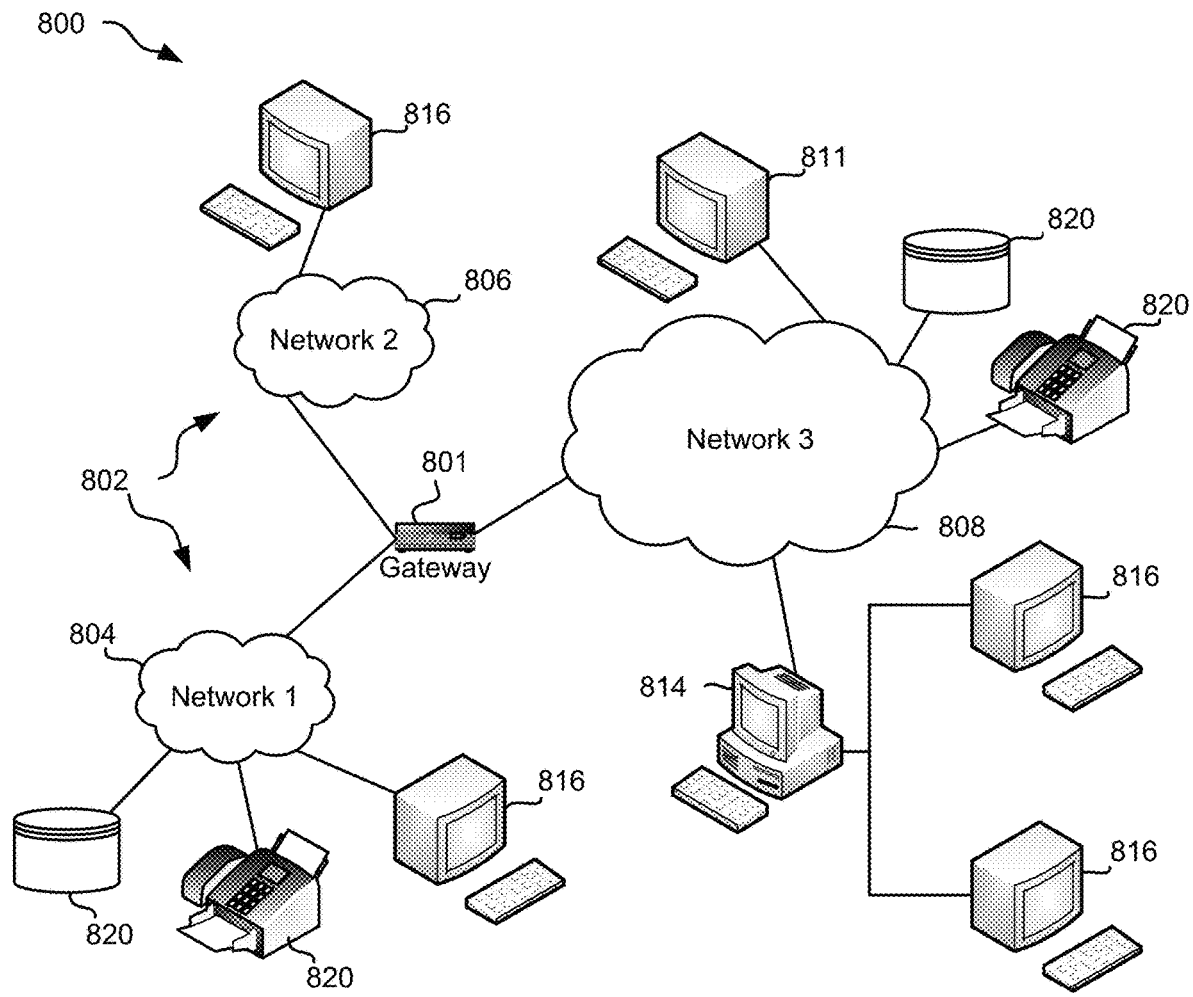
FIG. 8 is a network architecture, in accordance with one embodiment.

FIG. 8 illustrates a network architecture 800, in accordance with one embodiment. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 811 may also be directly coupled to any of the networks, in some embodiments.

A peripheral 820 or series of peripherals 820, e.g., facsimile machines, printers, scanners, hard disk drives, networked and/or local data storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 9:
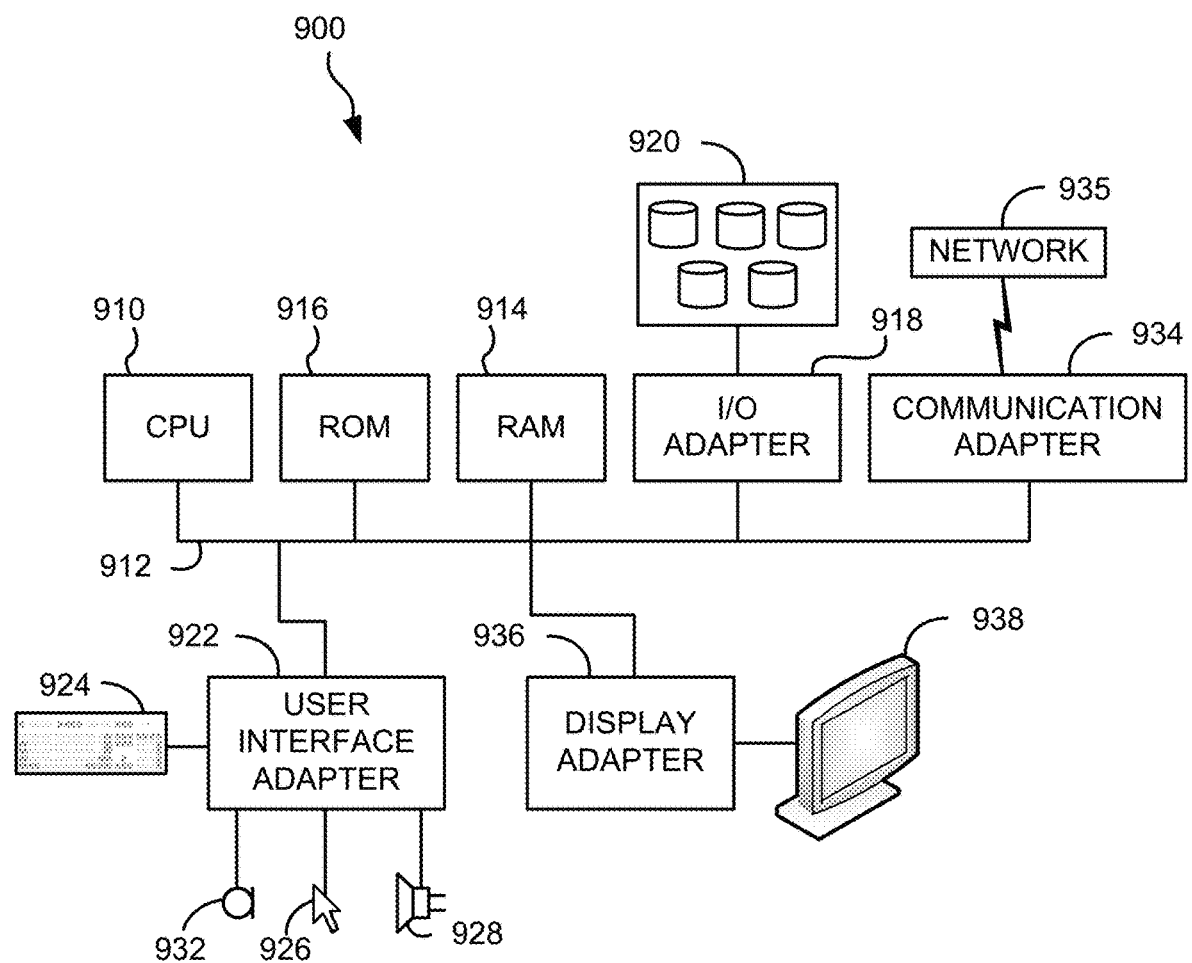
FIG. 9 is a representative hardware environment that may be associated with the servers and/or clients of FIG. 8, in accordance with one embodiment.

FIG. 9 shows a representative hardware environment associated with a user device 816 and/or server 814 of FIG. 8, in accordance with one embodiment. FIG. 9 illustrates a typical hardware configuration of a processor system 900 having a central processing unit 910, such as a microprocessor, and a number of other units interconnected via a system bus 912, according to one embodiment. In some embodiments, central processing unit 910 may include any of the approaches described above with reference to the one or more processors 210 of FIG. 2.

The processor system 900 shown in FIG. 9 includes a Random Access Memory (RAM) 914, Read Only Memory (ROM) 916, and an I/O adapter 918. According to some embodiments, which are in no way intended to limit the invention, I/O adapter 918 may include any of the approaches described above with reference to I/O adapter 218 of FIG. 2. Referring still to processor system 900 of FIG. 9, the aforementioned components 914, 916, 918 may be used for connecting peripheral devices such as storage subsystem 920 to the bus 912. In some embodiments, storage subsystem 920 may include a similar and/or the same configuration as data storage system 220 of FIG. 2. According to an example, which is in no way intended to limit the invention, storage subsystem 920 may include non-volatile data storage cards, e.g., having NVRAM memory cards, RAM, ROM, and/or some other known type of non-volatile memory, in addition to RAID controllers as illustrated in FIG. 2.

With continued reference to FIG. 9, a user interface adapter 922 for connecting a keyboard 924, a mouse 926, a speaker 928, a microphone 932, and/or other user interface devices such as a touch screen, a digital camera (not shown), etc., to the bus 912.

Processor system 900 further includes a communication adapter 934 which connects the processor system 900 to a communication network 935 (e.g., a data processing network) and a display adapter 936 which connects the bus 912 to a display device 938.

The processor system 900 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 10:
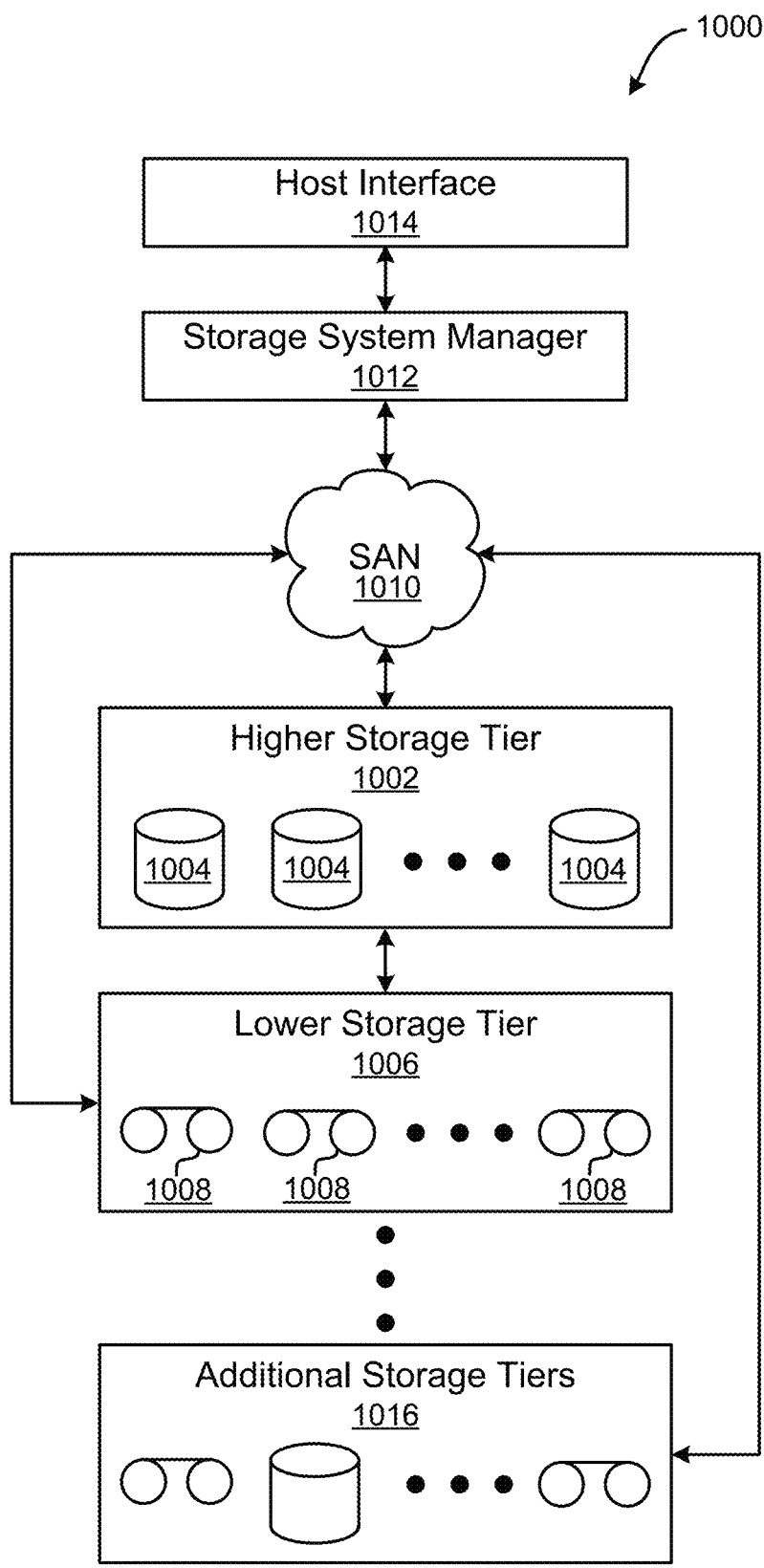
FIG. 10 is a tiered data storage system in accordance with one embodiment.

Moreover, FIG. 10 illustrates a storage system 1000 which implements high level (e.g., SSD) storage tiers in combination with lower level (e.g., magnetic tape) storage tiers, according to one embodiment. Note that some of the elements shown in FIG. 10 may be implemented as hardware and/or software, according to various embodiments. The storage system 1000 may include a storage system manager 1012 for communicating with a plurality of media on at least one higher storage tier 1002 and at least one lower storage tier 1006. However, in other approaches, a storage system manager 1012 may communicate with a plurality of media on at least one higher storage tier 1002, but no lower storage tier. The higher storage tier(s) 1002 preferably may include one or more random access and/or direct access media 1004, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1002 depending on the desired embodiment.

Referring still to FIG. 10, the lower storage tier(s) 1006 preferably includes one or more lower performing storage media 1008, including sequential access media such as magnetic tape in tape drives and/or optical media, slower accessing HDDs, slower accessing SSDs, etc., and/or others noted herein or known in the art. One or more additional storage tiers 1016 may include any combination of storage memory media as desired by a designer of the system 1000. Thus the one or more additional storage tiers 1016 may, in some approaches, include a SSD system architecture similar or the same as those illustrated in FIGS. 1-2. Also, any of the higher storage tiers 1002 and/or the lower storage tiers 1006 may include any combination of storage devices and/or storage media.

The storage system manager 1012 may communicate with the storage media 1004, 1008 on the higher storage tier(s) 1002 and lower storage tier(s) 1006 through a network 1010, such as a storage area network (SAN), as shown in FIG. 10, or some other suitable network type. The storage system manager 1012 may also communicate with one or more host systems (not shown) through a host interface 1014, which may or may not be a part of the storage system manager 1012. The storage system manager 1012 and/or any other component of the storage system 1000 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1000 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1002, may include a majority of SSD storage media for storing data in a higher performing storage environment, and remaining storage tiers, including lower storage tier 1006 and additional storage tiers 1016 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1002, while data not having one of these attributes may be stored to the additional storage tiers 1016, including lower storage tier 1006. Of course, one of skill in the art, upon reading the present descriptions, may devise many other combinations of storage media types to implement into different storage schemes, according to the embodiments presented herein.

According to some embodiments, the storage system (such as 1000) may include logic configured to receive a request to open a data set, logic configured to determine if the requested data set is stored to a lower storage tier 1006 of a tiered data storage system 1000 in multiple associated portions, logic configured to move each associated portion of the requested data set to a higher storage tier 1002 of the tiered data storage system 1000, and logic configured to assemble the requested data set on the higher storage tier 1002 of the tiered data storage system 1000 from the associated portions.

Of course, this logic may be implemented as a method on any device and/or system or as a computer program product, according to various embodiments.

It will be clear that the various features of the foregoing systems and/or methodologies may be combined in any way, creating a plurality of combinations from the descriptions presented above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for migrating data between block pools in a storage system, comprising:
    determining whether a number of blocks included in a ready-to-use (RTU) queue associated with a first block pool is in a first predetermined range, wherein the blocks in the first block pool are configured in single-level cell (SLC) mode, wherein blocks in a second block pool are configured in multi-bit-per-cell mode;
    in response to determining that the number of blocks included in the RTU queue is in the first predetermined range, determining whether an amount of overprovisioning present in the first block pool is in a third predetermined range,
    in response to determining that the amount of overprovisioning present in the first block pool is in the third predetermined range, selecting one or more blocks in the first block pool, and
    relocating data from the selected one or more blocks to one or more blocks in the RTU queue associated with the first block pool; and
    in response to determining that the number of blocks included in the RTU queue is not in the first predetermined range, determining whether a current input/output (I/O) workload experienced by the storage system is in a second predetermined range,
    in response to determining that the current I/O workload is in the second predetermined range, for each block in the first block pool:
        determining whether an amount of metadata associated with pages in the given block is greater than a predetermined threshold,
        in response to determining that the amount of metadata associated with the pages in the given block is greater than the predetermined threshold, selecting a subset of pages in the given block, and
        relocating data from the subset of pages in the given block to a block in the second block pool.

2. The computer-implemented method of claim 1, wherein selecting the subset of pages in the given block includes:
    evaluating the read and write heat of the data in the pages in the given block; and
    selecting pages in the given block which include data that has a lower write heat.

3. The computer-implemented method of claim 2, wherein relocating data from the subset of pages in the given block to a block in the second block pool includes:
    sending one or more instructions to store portions of the data having a higher read heat to higher performance pages in the block in the second block pool; and
    sending one or more instructions to store portions of the data having a lower read heat to lower performance pages in the block in the second block pool.

4. The computer-implemented method of claim 3, wherein the higher performance pages include lower pages and upper pages in three dimensional (3D) quad-level cell (QLC) NAND Flash, wherein the lower performance pages include extra pages and top pages in 3D QLC NAND Flash.

5. The computer-implemented method of claim 1, comprising:
    in response to determining that the amount of overprovisioning present in the first block pool is not in the third predetermined range, selecting one or more blocks in the first block pool; and
    relocating data from the selected one or more blocks to one or more blocks in the second block pool.

6. The computer-implemented method of claim 1, wherein the blocks in the second pool that are configured in multi-bit-per-cell mode are configured in a multi-bit-per-cell mode selected from the group consisting of: triple-level cell (TLC) mode, quad-level cell (QLC) mode, and penta-level cell (PLC) mode.

7. A computer program product for migrating data between block pools in a storage system, the computer program product comprising a computer readable storage medium having program instructions embodied therewith, the program instructions readable and/or executable by a processor to cause the processor to:
    determine, by the processor, whether a number of blocks included in a ready-to-use (RTU) queue associated with a first block pool is in a first predetermined range, wherein the blocks in the first block pool are configured in single-level cell (SLC) mode, wherein blocks in a second block pool are configured in multi-bit-per-cell mode;
    in response to determining that the number of blocks included in the RTU queue is in the first predetermined range, determine, by the processor, whether an amount of overprovisioning present in the first block pool is in a third predetermined range,
    in response to determining that the amount of overprovisioning present in the first block pool is in the third predetermined range, select, by the processor, one or more blocks in the first block pool, and
    relocate, by the processor, data from the selected one or more blocks to one or more blocks in the RTU queue associated with the first block pool; and
    in response to determining that the number of blocks included in the RTU queue is not in the first predetermined range, determine, by the processor, whether a current input/output (I/O) workload experienced by the storage system is in a second predetermined range, in response to determining that the current I/O workload is in the second predetermined range, for each block in the first block pool:
  determine, by the processor, whether an amount of metadata associated with pages in the given block is greater than a predetermined threshold,
  in response to determining that the amount of metadata associated with the pages in the given block is greater than the predetermined threshold, select, by the processor, a subset of pages in the given block, and
  relocate, by the processor, data from the subset of pages in the given block to a block in the second block pool.

8. The computer program product of claim 7, wherein selecting the subset of pages in the given block includes:
  evaluating the read and write heat of the data in the pages in the given block; and
  selecting pages in the given block which include data that has a lower write heat.

9. The computer program product of claim 8, wherein relocating data from the subset of pages in the given block to a block in the second block pool includes:
  sending one or more instructions to store portions of the data having a higher read heat to higher performance pages in the block in the second block pool; and
  sending one or more instructions to store portions of the data having a lower read heat to lower performance pages in the block in the second block pool.

10. The computer program product of claim 9, wherein the higher performance pages include lower pages and upper pages in three dimensional (3D) quad-level cell (QLC) NAND Flash, wherein the lower performance pages include extra pages and top pages in 3D QLC NAND Flash.

11. The computer program product of claim 7, wherein the program instructions are readable and/or executable by the processor to cause the processor to:
  in response to determining that the amount of overprovisioning present in the first block pool is not in the third predetermined range, select, by the processor, one or more blocks in the first block pool; and
  relocate, by the processor, data from the selected one or more blocks to one or more blocks in the second block pool.

12. The computer program product of claim 7, wherein the blocks in the second pool that are configured in multi-bit-per-cell mode are configured in a multi-bit-per-cell mode selected from the group consisting of: triple-level cell (TLC) mode, quad-level cell (QLC) mode, and penta-level cell (PLC) mode.

13. A system, comprising:
  a plurality of non-volatile random access memory (NVRAM) blocks configured to store data;
  a processor; and
  logic integrated with and/or executable by the processor for migrating data between block pools in a storage system, the logic being configured to:
    determine, by the processor, whether a number of blocks included in a ready-to-use (RTU) queue associated with a first block pool is in a first predetermined range, wherein the blocks in the first block pool are configured in single-level cell (SLC) mode, wherein blocks in a second block pool are configured in multi-bit-per-cell mode;
    in response to determining that the number of blocks included in the RTU queue is in the first predetermined range, determine, by the processor, whether an amount of overprovisioning present in the first block pool is in a third predetermined range,
    in response to determining that the amount of overprovisioning present in the first block pool is in the third predetermined range, select, by the processor, one or more blocks in the first block pool, and
    relocate, by the processor, data from the selected one or more blocks to one or more blocks in the RTU queue associated with the first block pool; and
    in response to determining that the number of blocks included in the RTU queue is not in the first predetermined range, determine, by the processor, whether a current input/output (I/O) workload experienced by the storage system is in a second predetermined range,
    in response to determining that the current I/O workload is in the second predetermined range, for each block in the first block pool:
      determine, by the processor, whether an amount of metadata associated with pages in the given block is greater than a predetermined threshold,
      in response to determining that the amount of metadata associated with the pages in the given block is greater than the predetermined threshold, select, by the processor, a subset of pages in the given block, and
      relocate, by the processor, data from the subset of pages in the given block to a block in the second block pool.

14. The system of claim 13, wherein selecting the subset of pages in the given block includes:
  evaluating the read and write heat of the data in the pages in the given block; and
  selecting pages in the given block which include data that has a lower write heat.

15. The system of claim 14, wherein relocating data from the subset of pages in the given block to a block in the second block pool includes:
  sending one or more instructions to store portions of the data having a higher read heat to higher performance pages in the block in the second block pool; and
  sending one or more instructions to store portions of the data having a lower read heat to lower performance pages in the block in the second block pool.

16. The system of claim 15, wherein the higher performance pages include lower pages and upper pages in three dimensional (3D) quad-level cell (QLC) NAND Flash, wherein the lower performance pages include extra pages and top pages in 3D QLC NAND Flash.

17. The system of claim 13, the logic being configured to:
  in response to determining that the amount of metadata associated with the pages in the given block is not greater than the predetermined threshold, skip, by the processor, over the given block.

18. The system of claim 17, the logic being configured to:
  in response to determining that the amount of overprovisioning present in the first block pool is not in the third predetermined range, select, by the processor, one or more blocks in the first block pool; and
  relocate, by the processor, data from the selected one or more blocks to one or more blocks in the second block pool.

* * * * *